United States Patent
Wein et al.

(10) Patent No.: US 10,547,585 B2
(45) Date of Patent: *Jan. 28, 2020

(54) CONTENT DELIVERY NETWORK (CDN) CONTENT SERVER REQUEST HANDLING MECHANISM WITH METADATA FRAMEWORK SUPPORT

(71) Applicant: Akamai Technologies, Inc., Cambridge, MA (US)

(72) Inventors: Joel M. Wein, Flushing, NY (US); John Josef Kloninger, Cambridge, MA (US); Mark C. Nottingham, Melbourne (AU); David R. Karger, Cambridge, MA (US); Philip A. Lisiecki, Milton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,526

(22) Filed: Dec. 19, 2017

(65) Prior Publication Data

US 2018/0109489 A1    Apr. 19, 2018

Related U.S. Application Data

(63) Continuation of application No. 14/880,800, filed on Oct. 12, 2015, now Pat. No. 9,847,966, which is a (Continued)

(51) Int. Cl.
*G06F 15/16* (2006.01)
*H04L 29/12* (2006.01)
(Continued)

(52) U.S. Cl.
CPC ...... *H04L 61/1576* (2013.01); *H04L 61/1511* (2013.01); *H04L 63/08* (2013.01);
(Continued)

(58) Field of Classification Search
None
See application file for complete search history.

(56) References Cited

U.S. PATENT DOCUMENTS 6,108,703 A * 8/2000 Leighton ............. G06F 17/3089
                                                      709/226
6,226,618 B1 * 5/2001 Downs ................... G06F 21/10
                                                      380/279
(Continued)

*Primary Examiner* — Mohamed Ibrahim
(74) *Attorney, Agent, or Firm* — David H. Judson

(57) ABSTRACT

To serve content through a content delivery network (CDN), the CDN must have some information about the identity, characteristics and state of its target objects. Such additional information is provided in the form of object metadata, which according to the invention can be located in the request string itself, in the response headers from the origin server, in a metadata configuration file distributed to CDN servers, or in a per-customer metadata configuration file. CDN content servers execute a request identification and parsing process to locate object metadata and to handle the request in accordance therewith. Where different types of metadata exist for a particular object, metadata in a configuration file is overridden by metadata in a response header or request string, with metadata in the request string taking precedence.

9 Claims, 4 Drawing Sheets

Related U.S. Application Data continuation of application No. 13/936,550, filed on Jul. 8, 2013, now Pat. No. 9,160,704, which is a continuation of application No. 13/400,146, filed on Feb. 20, 2012, now Pat. No. 8,484,319, which is a continuation of application No. 11/772,547, filed on Jul. 2, 2007, now Pat. No. 8,122,102, which is a continuation of application No. 09/835,663, filed on Apr. 16, 2001, now Pat. No. 7,240,100.

(60) Provisional application No. 60/197,211, filed on Apr. 14, 2000.

(51) Int. Cl.
    *H04L 29/08*     (2006.01)
    *H04L 29/06*     (2006.01)

(52) U.S. Cl.
    CPC ...... *H04L 65/1063* (2013.01); *H04L 65/4069* (2013.01); *H04L 67/02* (2013.01); *H04L 67/1002* (2013.01); *H04L 67/1008* (2013.01); *H04L 67/1006* (2013.01)

(56) References Cited

U.S. PATENT DOCUMENTS

| | | | |
|---|---|---|---|
| 8,812,627 B2* | 8/2014 | Donahue | G06F 9/5072 709/220 |
| 2009/0234845 A1* | 9/2009 | DeSantis | H04L 43/026 |
| 2011/0055312 A1* | 3/2011 | Purdy, Sr. | H04L 29/12066 709/203 |

* cited by examiner

CONTENT DELIVERY NETWORK (CDN) CONTENT SERVER REQUEST HANDLING MECHANISM WITH METADATA FRAMEWORK SUPPORT

BACKGROUND OF THE INVENTION

Technical Field

The subject matter herein relates generally to high-performance, fault-tolerant HTTP, streaming media and applications delivery in a content delivery network (CDN).

Description of the Related Art

It is well-known to deliver HTTP and streaming media using a content delivery network (CDN). A CDN is a self-organizing network of geographically distributed content delivery nodes that are arranged for efficient delivery of digital content (e.g., Web content, streaming media and applications) on behalf of third party content providers. A request from a requesting end user for given content is directed to a "best" replica, where "best" usually means that the item is served to the client quickly compared to the time it would take to fetch it from the content provider origin server. An entity that provides a CDN is sometimes referred to as a content delivery network service provider or CDNSP.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet Points of Presence, access points, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

CDNSPs may use content modification to tag content provider content for delivery. Content modification enables a content provider to take direct control over request-routing without the need for specific switching devices or directory services between the requesting clients and the origin server. Typically, content objects are made up of a basic structure that includes references to additional, embedded content objects. Most web pages, for example, consist of an HTML document that contains plain text together with some embedded objects, such as .gif or .jpg images. The embedded objects are referenced using embedded HTML directives, e.g., Uniform Resource Identifiers (URIs). A similar scheme is used for some types of streaming content which, for example, may be embedded within an SMIL document. Embedded HTML or SMIL directives tell the client to fetch embedded objects from the origin server. Using a CDN content modification scheme, a content provider can modify references to embedded objects so that the client is told to fetch an embedded object from the best surrogate (instead of from the origin server).

In operation, when a client makes a request for an object that is being served from the CDN, an optimal or "best" edge-based content server is identified. The client browser then makes a request for the content from that server. When the requested object is not available from the identified server, the object may be retrieved from another CDN content server or, failing that, from the origin server.

In some CDNs, such as Akamai FreeFlow® content delivery service, data about the content provider's (CP's) objects, or so-called "metadata," is often directly encoded "in-URL," namely in the HTML or SMIL directives that are modified during the content modification process. More specifically, metadata is the set of all control options and parameters that determine how a CDN content server will handle a request for an object. Such metadata may include, for example, a CP code or other internal tracking number used, for example, to facilitate billing, coherence information (e.g., TTL or fingerprint) about how CDN servers should cache the object and maintain its freshness, a unique serial number value that may be used for load balancing, access control data, a hostname identifying the origin server where a copy of the object may be located, and other feature-specific metadata.

By including object metadata directly in the HTML or SMIL directives, content providers may set up their metadata as part of the publication process, i.e., without requiring changes in their web server or involving network operations personnel. The "in-URL" embedding technique ensures that any modified URL pointing to the CDN has, in a self-contained way, the information needed to serve the object. On the other hand, the modified URL generated by this process is often long and complex. In addition, some content providers may only have a need to specify site-wide or global metadata specifications.

Thus, there remains a need to provide a framework that allows for both a simple method of creating modified URLs for sites with simple global metadata specifications, while allowing arbitrary complexity for sites with arbitrarily complex metadata needs.

BRIEF SUMMARY OF THE INVENTION

To serve content through a content delivery network (CDN), the CDN must have some information about the identity, characteristics and state of its target objects. Such additional information is provided in the form of object metadata, which according to the invention can be located in the request string itself, in the response headers from the origin server, in a metadata configuration file distributed to CDN servers, or in a per-customer metadata configuration file. CDN content servers execute a request identification and parsing process to locate object metadata and to handle the request in accordance therewith. Where different types of metadata exist for a particular object, metadata in a configuration file is overridden by metadata in a response header or request string, with metadata in the request string taking precedence More generally, the subject matter herein specifies interfaces that control CDN content server behavior, and it further describes those behaviors. A preferred means of control is a metadata component, which preferably takes the form of a key/value pair, and which is used to communicate desired handling of an object to CDN content servers. These components can be associated with requests in a number of ways, including CDN-generated configuration files, customer (CP) configuration files, and request-based and response-based mechanisms. Other controls include request-URI rewriting to allow the request-URI itself to be changed when necessary. Requests themselves may take on a number of forms, depending on customer requirements.

In an illustrative embodiment, the subject matter herein describes a method that is operative in a content delivery network (CDN) wherein participating content providers identify content to be served from a set of CDN content servers in response to requests, and wherein the CDN uses metadata to determine how a CDN content server will handle a request for a given object. The method begins by establishing a framework that enables delivery of metadata to a given CDN content server either in-band or out-of-band. "In-band" means that the metadata is delivered in a request string for the object ("in-ARL") or within an HTTP response header, e.g., when a CDN content server contacts the participating content provider upon a cache miss the first time the object is requested from the CDN server. "Out-of-band" means that the metadata is delivered to a given content server in a separate configuration file. According to the method, when a request for the given object is given CDN content server, the request is parsed to identify a set of metadata. At least one precedence rule is then applied to the set to identify given metadata to be applied to the given content prior to serving a response. Preferably, in-band-delivered metadata overrides out-of-band metadata, and in-ARL metadata overrides HTTP response header metadata when both are available.

The foregoing has outlined some of the pertinent features and advantages of the subject disclosure. A more complete understanding of the invention is provided in the following Detailed Description of the Preferred Embodiment.

DETAILED DESCRIPTION OF THE PREFERRED EMBODIMENT

Figure 1:
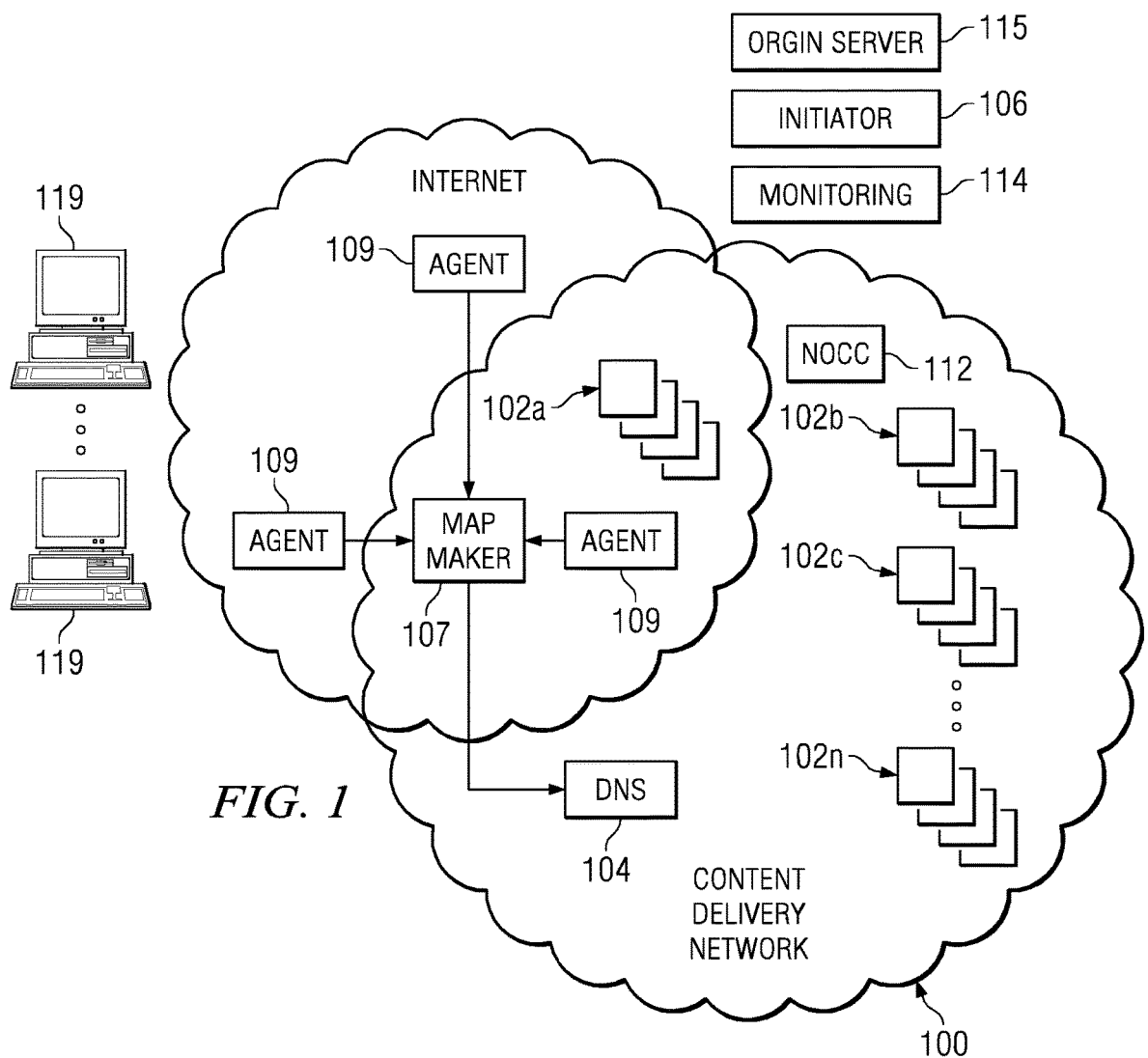
FIG. 1 is a block diagram of a content delivery network in which the subject matter herein may be implemented.

FIG. 1 is a diagram showing one such illustrative content delivery network. The content delivery service comprises a preferably global content delivery network (CDN) 100 of content delivery server regions 102a-n, a domain name service (DNS) system 104, and a content modification or "initiator" tool 106 that allows content to be tagged for inclusion on the network. DNS system 104 receives network mapping data from a map maker 107, which receives inputs from monitoring agents 109 distributed throughout the Internet. Agents typically perform various tests and monitor traffic conditions to identify Internet congestion problems.

The map maker 107 takes the data generated from the agents and generates one or more maps detailing Internet traffic conditions. Generally, the content delivery service allows the network of content delivery server regions 102a-n to serve a large number of clients efficiently. Each region may include one or more content servers, with multiple content servers typically sharing a local area network (LAN) backbone. Although not meant to be limiting, a typical server is an Intel Pentium-based caching appliance running the Linux operating system with a large amount of RAM and disk storage. As also seen in FIG. 1, the content delivery service may include a network operations control center (NOCC) 112 for monitoring the network to ensure that key processes are running, systems have not exceeded capacity, and that subsets of content servers (the so-called CDN regions 102) are interacting properly. A content provider operates an origin server (or server farm) 115 from which requesting end users 119 would normally access the content provider's Web site via the Internet. Use of the CDN avoids transit over the Internet for selected content. The content provider may also have access to a monitoring suite 114 that includes tools for both real-time and historic analysis of customer data. One tool is a traffic analyzer that provides multiple monitoring views that enable quick access to network and customer-specific traffic information. A reporter tool allows for viewing of historical data. A billing tool may be used to generate appropriate billing information for the content provider, who typically pays for the service as a function of the amount of content delivered by the CDN.

High-performance content delivery is provided by directing requests for web objects (e.g., graphics, images, streaming media, HTML and the like) to the content delivery network. In one known technique, known as Akamai FreeFlow® content delivery, HTTP and/or streaming media content may be first tagged for delivery by the tool 106, which, for example, may be executed by a content provider at the content provider's web site 115. The initiator tool 106 converts URLs that refer to streaming content to modified resource locators, called ARLs for convenience, so that requests for such media are served preferentially from the CDN instead of the origin server. When an Internet user visit's a CDN customer's site (e.g., origin server 115) and, for example, selects a link to view or hear streaming media, the user's system resolves the domain in the ARL to an IP address. In particular, because the content has been tagged for delivery by the CDN, the URL modification, transparent to the user, cues a CDN domain name service (DNS) to query a CDN name server (or hierarchy of name servers) 104 to identify the appropriate media server from which to obtain the stream. A CDN name server is sometimes referred to herein as a surrogate origin server, as it acts authoritatively on behalf of the CP origin servers who contract with the CDNSP. The CDN typically implements an authoritative DNS (e.g., under the control of maps generated from the monitoring agents 109 and map maker 107) to identify an optimal server for each user at a given moment in time. Further details of a CDN DNS mechanism are described in U.S. Pat. No. 6,108,703, which is incorporated herein by reference.

Metadata is data about the content provider's objects. More specifically, metadata is the set of all control options and parameters that determine how a CDN content server will handle a request for an object. To be handled by a CDN server, preferably all objects have a set of metadata associated with them, such as one or more of the following:

CP Code—an internal tracking number, primarily used for billing;

Serial Number—a CDN-specific value used for load balancing and monitoring;

Origin Server—the location of the original copy of the object, which a CDN server may need to fetch or revalidate the object;

Coherence information—information (e.g., fingerprint, time-to-live (TTL)) about how CDN servers should cache the object and maintain its freshness.

If a content provider uses CP-side content migration, e.g., through an initiator tool, the content provider's URI's are converted into alternate resource locators (ARLs) in the HTML. The ARL's contain all of the required metadata "in-URL" or, as sometimes referred to herein, "in-ARL." Beyond the basic metadata set forth above, there may be additional metadata, some of which is used to enable other features of the CDN service. For example, there may be metadata settings that control logging of cookies or referrer field with customer logs. There may be metadata settings to require that CDN servers revalidate an object before it is served if the time-to-live has expired, or to serve a default object if the cached object cannot be revalidated. This additional metadata may be conveniently specified outside the ARL, e.g., in HTTP response headers or customer-specific configuration files, as will be seen.

Figure 2:
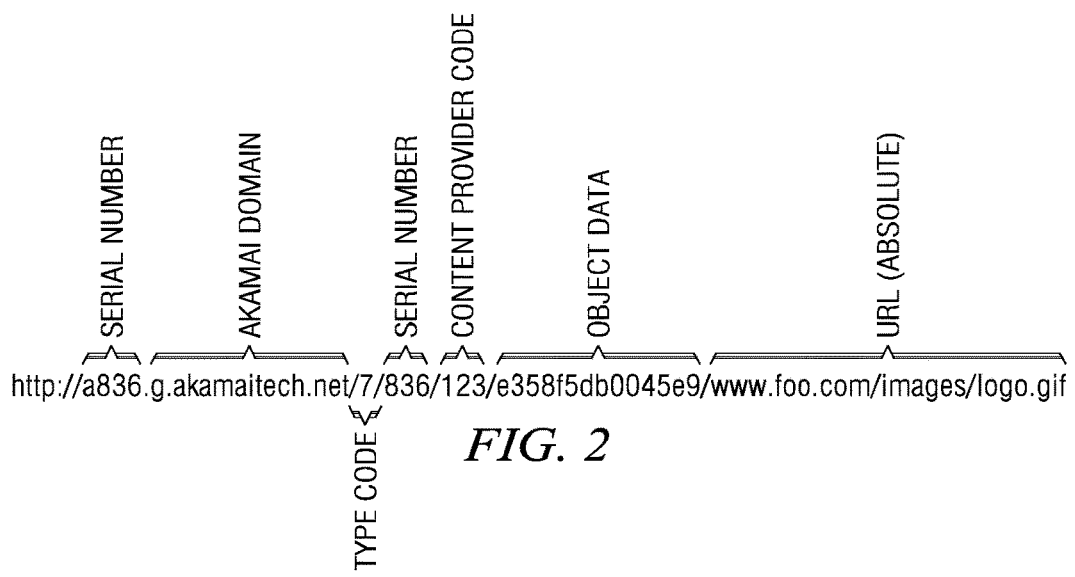
FIG. 2 is an illustrative "long" form ARL.

As described above and in U.S. Pat. No. 6,108,703, one approach to migrating content for delivery over the CDN is through use of a content initiator (e.g., a computer program, a set of scripts, or the like) executable at the content provider origin server. In one illustrative embodiment, this tool generates a so-called "long" form ARL that includes, among other information, given object service metadata that is useful in determining how the object is to be served by the content delivery service. If the format for a typical embedded object URL is . . . www.foo.com/images/logo.gif, an illustrative long form ARL is then as shown in FIG. 2, where the " . . . " refers to the standard "http://" or the like nomenclature. In this example, which is not meant to be taken by way of limitation, the object service metadata is embedded into the ARL during the publication process, e.g., by executing the initiator tool. Each field in the ARL contains information that may be used by the content delivery network. For example, the serial number is a virtual bucket of data used for load balancing algorithms. The CDN network domain is used to retrieve the resource from the content delivery service. This may be, for example, 'g.akamaitech.net'. As described in U.S. Pat. No. 6,108,703, the serial number and the content delivery service's network domain may form a hostname that ultimately gets resolved to an IP address for the optimal server best suited to handle the end-user's request.

Referring again back to FIG. 2, again by way of example only, the typecode may be used for object coherence to address specific business rules. Thus, for example, a typecode "6" may mean the object has a TTL of 30 minutes. A typecode f, for example, may mean an object TTL, expressed as a number of seconds, minutes, hours or days, is specified in the ARL. Of course, these are merely exemplary. The content provider code is a numeric identification of the content provider that is associated with this request. Requests on the CDN may only be honored if they access a known customer, i.e., a given origin server hostname. The object metadata field is another coherence mechanism that may be generated by the initiator tool to uniquely identify an object. This "fingerprint" may be used to check for "freshness" and, together with other information in the ARL, to guarantee that the CDN does not serve stale information. The object data can be based on such information as the file contents, modification times and the current time. The URL (absolute) field contains the origin server hostname of the customer and the original URL path component.

In one aspect, the subject matter herein implements a novel ARL framework that supports a number of different types of metadata. The first type is system-wide default metadata. These are the default service settings for any object in the CDN and, as will be seen, such settings may be overridden by more specific forms of metadata. The second metadata type is sitedata, which is metadata that applies to every object on a site. The third type is named metadata, which is a way of assigning a name to metadata definitions that should only apply to some objects on a site. The fourth type is per-object metadata. The first three types of metadata are so-called "exodata" in that they do no appear in the ARL. When required, these metadata types must be obtained (by the CDN content server) from elsewhere, e.g., the content provider directly, or from the CDNSP. The per-object metadata can be either "endodata" (which appears in the ARL) or exodata. Thus, per object metadata may be explicitly represented in the ARL or the CDN content server can get it from the content provider. A long form ARL as identified above includes per-object metadata as endodata. Preferably, per object metadata may be stored (at the CDN content server) in a file associated with the object to be served.

When the CDN resolves an ARL to identify a best CDN content server, an IP address of the best CDN content server to handle the request is identified. The request is then delivered from the end user's browser to the identified CDN content server. When that server receives the ARL (namely, the object request), the CDN content server assumes as a default that all objects have the system-wide default metadata. If the ARL includes site-wide or named metadata for that object, the CDN content server uses it to override the specified system default behaviors. Finally, per-object metadata need only be specified that overrides otherwise applicable system-wide or site-wide metadata. This framework assumes the goal of given very simple method of creating ARLs for sites with simple global metadata specifications, while allowing arbitrary complexity for sites with arbitrarily complex ARL needs.

The following options generally illustrate how the various types of object service metadata are used. For purposes of illustration, assume that the ARL is created for the embedded object having the following URL: . . . //cnn.com/science/pictures/leaf.jpg. Option I is useful for browsers that send host headers with their client requests. This is typical operation for a browser conforming to the HTTP 1.1 Specification. In Option I, the content provider customer delegates a domain (e.g., images.cnn.com) to the CDNSP. The CDNSP may then alias this domain (e.g., via a DNS CNAME) to a hostname (e.g., a16.g.akamai.net) that it controls. This chosen domain takes the place of the hostname in the URL; thus, the ARL becomes: . . . //images.cnn.com/science/picture/leaf.jpg. When this ARL is received at a CDN content server, the CDN content server relies on the presence of a host header in the HTTP request. From the host header, the content server can determine the appropriate metadata and use that metadata to locate and serve the object. In an illustrative embodiment, the absence of a typecode in this ARL tells the content server that this is an Option I ARL.

Option II does not rely on host headers or the use of a CNAME. In this option, the ARL uses a CDN hostname (e.g., a244.g.akamai.net). Alternatively, the content provider customer can again delegate a domain (e.g., a244.g.cnn.net) to the CDNSP. Under this option, the ARL looks like:

. . . //a244.g.akamai.net/*/cnn.com/science/pictures/leaf.jpg
or

. . . //a244.g.cnn.net/*/cnn.com/science/pictures/leaf.jpg. The * character denotes a character that cannot appear in a valid path. The presence of the * character tells the CDN content server to interpret this ARL as an Option II ARL. The site-wide metadata for cnn.com (the field after the * in this example) is then used to serve the object.

In Option III, a set of abbreviations/codes/nicknames preferably are supported for certain predefined metadata. A representative syntax is the use of a given code, e.g., 101, as a nickname for cnn.com, typecode f, TTL 30 m, CP code 23, and the like. Then, the format of such an ARL would be: . . . //a244.g.akamai.net/*101/science/pictures/leaf.jpg or . . . //a244.g.cnn.net/*101/science/pictures/leaf.jpg. As in Option II, the * character denotes a character that cannot appear in a valid path. If desired, the definition of code 101 could be extended to refer not just to cnn.com, but rather to cnn.com/science/pictures. In such case, the ARL could simply become . . . //a244.g.cnn.net/*101/leaf.jpg. In Option III, the content provider may store the metadata definitions on its origin server and the CDN content servers may fetch them as needed. Alternatively, the content provider may provide the metadata to the CDNSP, who may then securely publish the metadata to all CDN content servers using a metadata publishing mechanism. One such mechanism is described generally below. In this scenario, the metadata definitions may have a very long TTL.

Option IV is the per-object metadata option. As described above, the per-object metadata may be endodata (embedded within the ARL) or exodata (obtained by the content server from the content provider). A typical endodata ARL would be as follows:

. . . //a244.g.akamai.net/<typecode>/<metadata>/cnn.com/science/pictures/leaf.jpg or (in the case of domain delegation:

. . . //a244.g.cnn.net/<typecode>/<metadata>/cnn.com/science/pictures/lead.jpg.

In either case, the CDN content server would determine from the content provider's host name (cnn.com) the sitedata for the object, which would then be overridden by metadata placed explicitly in the ARL. This avoids the need for the content provider customer to repeat metadata that agrees with that of the site. Preferably, the metadata is represented as value-attribute pairs in endodata in an ARL and is represented using XML when stored as site data on the content provider origin server or in a content server table.

In the above example, the object service metadata is embedded into the ARLs when the content provider initializes its site for operation with the CDN. As noted above, this allows content providers to set up their metadata as part of the publication process, without requiring changes to their web server. The ARL can be reduced in size and complexity by having the content provider simply incorporate a fixed string prefix into the embedded object URL instead of the content provider's network domain and the other object service metadata as described above. In addition, the content provider delegates to the content delivery service the content provider's domain name so that the "shortform" ARL can still be resolved to the content delivery service's network of content servers. In this embodiment, the object service metadata may be maintained by the content provider and/or the CDNSP and then obtained as needed to service a given client request. A benefit of this approach is that is allows ARLs to look almost exactly like URLs, with only the hostname portion thereof changed. It also allows the content provider to revise metadata about the object without republishing pages that include the object.

According to the invention, it is assumed that information about how to handle a content provider's objects exists potentially in multiple locations: in-ARL, HTTP response headers, and (CDN-generated or CP-generated) configuration files. A CDN-generated metadata configuration file may be distributed to all or a portion of the CDN servers, preferably by some central authority, such as the CDNSP. A metadata configuration file can be "pushed" out to all servers when it changes, or "pulled" periodically from a set of intermediate staging servers, potentially via the CDN itself. This configuration file preferably is signed and preferably encrypted before delivery. An illustrative "pull-based" metadata configuration file transmission system is shown below. A per-customer metadata configuration file may be located on the customer's server to maximize a customer's ability to customize the metadata configuration for the CP's objects. This configuration file preferably is also signed (e.g., by the CDN and/or by the customer) and preferably encrypted as well.

As noted above, metadata in the ARL is specific to the individual request the ARL issues. Metadata within HTTP response headers (HRH) is specific to the object with which the HRH is sent. Content providers directly control these metadata assignments, because CP's generate the ARLs and response headers at their site. Metadata in configuration files is more general than the other types. This metadata generally cannot be assigned on a per-object basis. It either applies to the entire domain, or it can be assigned based on file directories or file extensions on the origin server. The CDNSP may change the CDN-generated metadata configuration file. The content provider may customize the settings in the CP-generated configuration file, e.g., via a secure Web-based graphical user interface.

According to an advantage of the present invention, different types of metadata have an order of precedence as follows: in-ARL metadata, HTTP response header metadata, configuration file metadata. Thus, generally the metadata contained in an ARL takes precedence over metadata contained in HTTP response headers, which in turn takes precedence over metadata in configuration files. An example of how these precedence rules are applied is provided below.

The following is a detailed description of an implementation of an extensible framework for request and response handling in a CDN content server wherein metadata about an object (e.g., HTML, a page object, or the like) is available in different types, e.g., system-wide default metadata, site metadata, named metadata, and per-object metadata. As noted above, metadata may be made available to the CDN content server in-ARL, via HTTP headers, via configuration files, or some combination thereof. As used herein, the following terms are defined as follows:

Alternate Resource Locator (ARL)—A URL, possibly with CDN-specific data embedded. ARLs are a subset of URLs, and are used to direct requests to CDN servers CDN server (a/k/a global host or "Ghost")—An Internet-available server that acts as an authoritative Web server (or, a surrogate origin server for objects nominated by CDN customers).

origin-request-URI—The Request-URI (see HTTP/1.1, section 5.1 [RFC2616]) used by CDN servers to locate an object on its origin server.

published-request-URI—The Request-URI used to locate an object on a CDN server; the request-URI portion of the ARL.

CDN virtual host—A hostname in an CDNSP-owned domain that directs requests to CDN servers, for instance, a500.g.akamaitech.net.

CNAME host—A customer-owned hostname that resolves to a CDN Virtual Host; for instance, www.foo.com (which is aliased, e.g., to an akamaitech.net host).

delegation host—A hostname in a customer-owned subdomain that is managed by CDN for the customer; for instance, www.ak.foo.com (where the subdomain ak.foo.com is delegated to the CDN).

origin server—The master origin server for an object; the customer's Web server.

This description specifies interfaces that control CDN server behavior, and describes those behaviors. The primary means of control is the metadata component, which takes the form of a key/value pair, and communicates desired handling to CDN servers. These components can be associated with requests in a number of ways, including through CDN-Generated Configuration and Customer Configuration files, request-based and response-based mechanisms. Other controls include request-URI rewriting, to allow the request-URI itself to be changed when necessary, and capability throttling by the CDNSP, to control how the service is used. As will be seen, requests themselves may take a number of forms, depending on customer requirements. To accommodate multiple formats, the following describes a request identification and parsing process, which is used to resolve the information necessary to locate metadata and handle the request. Finally, mechanisms that maintain coherence for cacheable objects between CDN servers and customer origin servers are described.

The following is a detailed specification of a preferred CDN content server interface.

1. Configuring CDN Servers

CDN content servers may be configured by a number of files, which are then used to determine appropriate behaviors. The following describes these files and identifies preferred requirements for their formats.

1.1 CDN-Generated Configuration

CDN-generated configuration is used to distribute CDN server-wide configuration The formats of CDN-generated configuration files, and their behaviors, are described below in the section titled "CDN Server Interface Specification: CDN Configuration."

1.1.1 Host Configuration Table

A Host Configuration Table (HCT) may be used to help identify the request format during parsing, apply capability throttling to the request, and nominate a Customer Configuration ID to be used to locate customer-specific configuration. Requests may be matched with HCT entries by one of two methods; by a Host HTTP response header, or by an in-ARL token. Each defined request format states which method is used when attempting to locate a CDN-generated configuration entry. If a request does not match any CDN-generated configuration entry, it has no CDN throttling or customer configuration associated and, as a consequence, it must both be identifiable by the published-request-URI alone and have all required metadata communicated by other mechanisms. The CDN may also choose to use the HCT as a white list; that is, if a request does not match an HCT entry, it will be denied. The Host Configuration Table preferably is propagated by a metadata transmission mechanism described below.

1.2 Baseline Metadata

Baseline Metadata files may be used to effect miscellaneous server-wide configurations. Their format and payload are described below in the section titled "CDN Server Interface Specification: CDN Configuration."

1.3 Customer Configuration

Customer configuration files allow dictation of how requests should be handled, including the association of metadata, based on request attributes. Generally, a customer configuration file represents one customer. Depending on the nature of the customer's published content, all of a customer's requests might be mapped to one customer configuration file. Conversely, many configuration files may be created for one customer, if necessary (usually, when a customer has many Web sites with non-similar architectures).

1.3.1 Customer Configuration Services

Customer configuration provides the following services to a request identification and parsing process, to be used by each format as it requires:

determination of a "Transparent flag," based on a Host HTTP request header, which is used to identify Transparent requests;

After the request has been identified and parsed, other services become available:

origin server determination, including hostname, port and protocol;

metadata assignment, including request and response components;

origin-request-URI rewriting, e.g., to change the request-URI from "/foo.html" to "/foo.en.html";

metadata profiles, which provide an expansion of an arbitrary token into a set of metadata.

Each customer configuration file preferably is identified by a unique token, the Customer Configuration ID, and must make available which version of the customer configuration format it uses. Customer configuration preferably is propagated (e.g., from the customer to the CDNSP to the CDN servers) by a metadata transmission mechanism. A representative mechanism is described below.

2. Request Identification and Parsing

To accommodate different customer requirements and publishing situations, a number of acceptable ARL request formats are defined. To identify the request format being used, CDN servers preferably cycle through known formats, using the published-request-URI and request headers to identify the applicable format. Then, the request is parsed, possibly with the help of CDN and customer configuration data. Once identification and parsing is complete, these additional request attributes are available:

customer configuration ID—a unique identifier that points to customer configuration. Not all requests need have customer configuration associated in this manner.

capability throttling to limit the services available to a particular customer, or deny requests altogether (blacklisting).

in-ARL metadata—if any. May include the origin server.

origin-request-URI—a candidate for the Request-URI on the origin server; may be modified by customer configuration.

2.1 Request Requirements

Every request must have certain information available in order to process it. This information may be associated with a request by any defined, valid mechanism, but each of the following preferably are also available:

Origin Server identity (server identity, port and protocol)

a CPCode (via metadata)

some form of CDN coherence (described below)

2.2 Request Format Definitions

Each format describes a method of identifying it when iterating through formats in the order presented here, preferably stopping at the first match.

2.2.1 Transparent Content Migration

If a customer wishes to handle all traffic for a Web site through the CDN, they may do so by identifying it as Transparent, and either CNAMEing a hostname to a CDN virtual hostname, or delegating a domain to the CDNSP. This allows the customer to migrate their entire site without changing its content, or to create a site dedicated to serving CDN-specific content (such as images.foo.com, or www1.bar.com). Transparent requests are identified by the value of the Transparent flag, which is set in customer configuration. Due to their nature, Transparent requests must be matched with an HCT entry by the Host header, in order to find both the Transparent flag and necessary metadata, including the origin server identity.

Transparent requests follow the form:

Method SP origin-request-URI SP HTTP-Version CRLF
"Host" ":" SP hostname CRLF

Note that the published-request-URI is the origin-request-URI; Transparent requests will not be parsed for in-ARL metadata (including typecodes); the Transparent flag indicates that none is present. For example, GET/index.html HTTP/1.0
Host: www.foo.com would be located in the HCT by 'www.foo.com', and, if customer configuration were found with the transparent flag (where set), this request would be mapped to the origin server dictated by customer configuration, with the origin-request-URI '/index.html'.

2.2.2 CDN Prepend

Customers may also migrate content to the CDN by prepending a unique token to the beginning of the Request-URI. In an illustrative CDN, prepend requests are identified by the content of the first path segment (discounting parameters) in the published-request-URI; if the content contains more than one character, the request is considered a CDN prepend.

In an example, a CDN prepend requests follow the form

Method SP "/" inarltoken [freeform-inarl-metadata] "/" origin-request-URI SP HTTP-Version CRLF The in-ARL token will be used to match a HCT entry. If no HCT matches, or if customer configuration does not dictate an origin server, the in-ARL token will be used as the origin server. For example:

. . . //a500.g.akamaitech.net/www.foo.com/bar.gif would appear as this request:

GET/www.foo.com/bar.gif
Host: a500.g.akamaitech.net

The CDN server would use www.foo.com as the in-ARL token (and thus the origin server, if no HCT entry is matched or if customer configuration does not specify one) for the request, and /bar.gif for the origin-request-URI. CDN Prepend requests may contain freeform in-ARL metadata after the origin server candidate. For example, . . . //a500.g.akamaitech.net/www.foo.com;a=30m/bar.gif would be interpreted as having an origin server of www.foo.com, and in-ARL metadata of a=30 m.

2.2.3 Typecoded Request

Other request formats can be identified by use of a typecode, which dictates the format of the rest of the ARL. Requests that are not identified as Transparent or CDN Prepend and may follow the form:

Method SP "/" typecode [freeform-inarl-metadata]*["/" metadata]"/" origin-request-URI\
SP HTTP-Version CRLF where typecode is a character matching a supported typecode (see "Supported Typecodes"), will use that information to parse the published-request URI for metadata. Typecodes preferably are case-sensitive and are a single, alphanumeric character.

typecode=alphanum

For example,

. . . //a500.g.akamaitech.net/f/500/234/30m/www.foo.com/bar.gif looks like

GET/f/500/234/30m/www.foo.com/bar.gif HTTP/1.0
Host: a500.g.akamaitech.net as a request. The CDN server identifies it as typecode f, determines the related format, and then, (in this case) the server would use www.foo.com as the in-ARL token and /bar.gif as the origin-request-URI. Typecodes are used to identify a particular ARL format. A typecoded request may contain metadata and other mechanisms (e.g., coherence) as in-ARL metadata; if the expected format is violated, a 400 Bad Request status code will be returned.

The following typecode formats may be used:

Version 1 typecoded published-request-URIs follow the format:

--- v1-arl = "/" typecode "/" serial "/"
   cpcode "/" v1-inarl-coherence "/" \
     inarltoken "/" origin-request-URI
v1-inarl-coherence = ttl | nonce

---

All version 1 typecodes use the in-ARL token to locate an HCT entry. If no HCT entry matches, or if customer configuration does not specify an origin server, the in-ARL token will be used as the origin server.

A Version II typecode is host-based with metadata. This typecode finds a HCT entry by the Host header, and allows freeform in-ARL metadata. Note that this form is not a transparent-style request, as it will not have the Transparent flag set.

A-arl="/" "A" [freeform-inarl-metadata] "/" origin-request-URI

For example;

. . . //www.foo.com/A;Q;a=30h/bar.gif

Or, if no freeform in-ARL metadata needs to be communicated,

. . . //www.foo.com/A/bar.gif

3. Metadata Assignment

To give customers flexibility and convenience when using metadata, the present invention defines a selection of mechanisms for associating metadata components with requests. Metadata assignment encompasses two distinct phases: sourcing and application.

3.1 Sourcing Metadata

Figure 3:
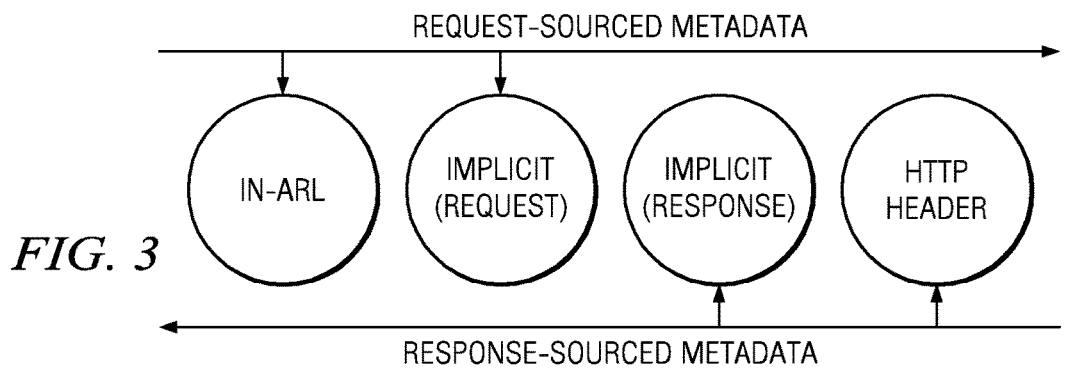
FIG. 3 is a simplified block diagram illustrating various metadata sourcing mechanisms.

Metadata is sourced, or discovered, from different mechanisms at specific points in the request/response path, and kept for the lifetime of the request, so that it may be applied at the appropriate time. FIG. 3 illustrates the Metadata Sourcing Mechanisms, which include In-ARL, Implicit (request), Implicit (response) and HTTP response Header. These are described in more detail below.

3.2 Metadata Application

Figure 4:
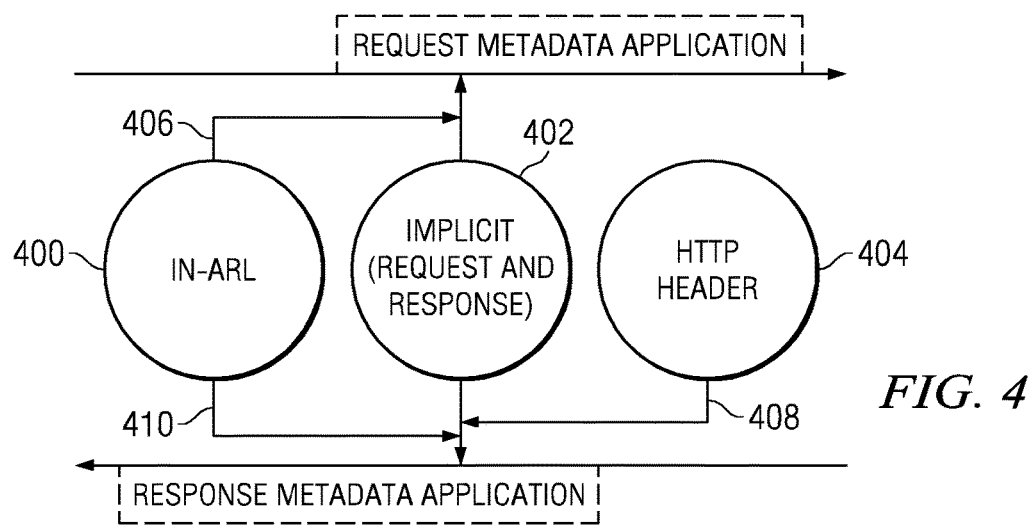
FIG. 4 illustrates how a CDN content server handles metadata, folding in overrides as they appear according to this disclosure.

When actually using metadata, CDN servers preferably work from the most general sourced mechanism to the most specific, folding in overrides as they appear as indicated in FIG. 4. This allows specifying defaults with general mechanism, while overriding those defaults on a per-object or per-instance basis with specific mechanisms. Metadata can be applied either during the request or the response phase, depending on its nature. This constraint limits the sourcing mechanisms that may be used to associate some metadata components; in particular, metadata that is to be applied during the request phase may not be sourced during the response phase.

With reference to FIG. 4, it can be seen that there may be three (3) basic types of metadata: in-ARL 400, implicit (request or response) 402, and HTTP response header 404. When metadata is transported in-ARL or via an HTTP response header, it is sometimes referred to herein as being "in-band," as compared to implicit metadata, which is made available "out-of-band"—typically from a configuration file (e.g., a file either distributed by a central authority or made available on a per-customer basis from a customer's server). As seen in FIG. 4, metadata is selectively applied during a given request or response according to given precedence rules. In particular, with respect to a request, the implicit metadata 402 is a default, and any in-ARL metadata 400 folds in and overrides the implicit metadata 402 as indicated by the arrow 406. With respect to a response, the implicit metadata 402 is the default and any HTTP response header metadata 404 folds in and overrides it as indicated by arrow 408, after which the in-ARL metadata 400 folds in and overrides the HTTP response header metadata 404 as indicated by the arrow 410.

3.3 Metadata Sourcing Mechanisms

Metadata sourcing mechanisms define a way to assign a value ('component-value') to a metadata component ('component-name'). A given component preferably can only have one value at a time. This includes components that allow values consisting of multiple fields; such values will be treated as a unit, and will be replaced as such if a more specific mechanism overrides that component's value. For instance, the metadata component 'foo' may have a list assigned to it:

foo="bar baz bat"

If this value is subsequently replaced by a more specific mechanism, it is done so as a unit:

foo="a"

so that the entire content of the 'foo' component is 'a', not 'bar baz bat a'. Internally, mechanisms may provide for the combination of metadata values where appropriate, or they may override previous values when multiple instances of the same component are encountered. See the individual mechanism definitions for more information. Each mechanism specifies a means of setting boolean metadata; typically, this is through use of the component-name without a value. Mechanisms also define a way to unset metadata. When metadata is unset, all previous values for that component are cleared, including those set by other, more general mechanisms.

Sourcing mechanisms are listed here from the most general to most specific.

3.3.1 Implicit Metadata

This is the most general mechanism for sourcing metadata, and is sourced based on object characteristics, rather than by being explicitly invoked. Instead, it is expressed in customer configuration. Implicit metadata is sourced at two points, one during the request and another during the response, to allow request metadata to be used, while allowing response characteristics to influence assignment of response metadata. Implicit request metadata is sourced based upon the request headers, origin server candidate and origin-request-URI candidate. Response metadata sourcing is based upon all of the above, as well as the response headers from the origin server. See "CDN Server Interface Specification: Customer-Generated Configuration Format" for more information.

3.3.2 Response Header Metadata

Just as the HTTP uses headers to communicate metadata between clients and servers, a CDN may define a specialized response header that customers may use to assign CDNSP metadata on a per-object basis. CDNSP-Control headers are formatted as:

AK-Control="AK-Control" ":" 1#([""] component-name["=" component-value])

Boolean metadata is formatted without a component-value. For example,

AK-Control: profile=G, akamai-maxage=30m, log-referer

If component-values contain reserved characters (specifically, double-quotes (" ") or commas (',')) or whitespace, the entire component must be quoted and reserved characters must be represented as quoted-strings (i.e., double-quotes represented as '\"', backslashes as '\\'). For example, AK-Control: log-cookie="foo bar", no-store If multiple instances of the same component are set in response headers, The last (in ordering of headers, and left-to-right in a single header) will be used. Note that HTTP intermediates are not required to preserve ordering of headers, which may cause problems if the same metadata component is used in multiple headers. Metadata components may be unset by prepending an exclamation point ('!') to the component-name, and not specifying a value. For example, AK-Control: !akamai-maxage CDNSP Control headers may contain only response metadata. CDN servers preferably will strip CDNSP Control headers from responses before forwarding them to clients.

3.3.3 In-ARL Metadata

Per-object metadata may also be transmitted inside the ARL itself, or implied by the structure of the ARL. Because in-ARL metadata is communicated in the published-request-URI, it must be compliant with the URI specification [RFC2396]. In particular, whitespace and reserved characters in freeform component-values must be escaped. Semicolons (';') and equalities ('=') used to separate component-names and component-values must not be escaped.

3.3.3.1 Structured In-ARL Metadata

In version 1 typecoded ARLs, the types of metadata communicated in-ARL are determined by the format of the ARL (through a typecode). Component-names should not be used; only the component-value is required. Structured in-ARL metadata does not offer a way to unset metadata, or assign arbitrary metadata.

3.3.3.2 Freeform In-ARL Metadata

An alternative ARL format uses freeform in-ARL metadata, which allows assignment of arbitrary metadata. Freeform in-ARL metadata is formatted as:

freeform-inarl-metadata=1*(";" component-name["=" component-value])

Boolean metadata is formatted without a component-value. For example,

;p=G;a=30m;ignore-query

If multiple instances of the same component are encountered in freeform in-ARL metadata, the last (left-to-right) will be used. Metadata components may be unset by prepending an exclamation point ('49') to the component-name. For instance, ;!ignore-query;!a If nameless metadata (i.e., a single token not beginning with T, and not reserved as a boolean metadata declaration) is encountered, CDN servers will attempt to use it as a profile reference; if there is not a matching profile, a 400 Bad Request error will be returned. For instance, the in-ARL metadata section:

;G;ignore-query;a=30m

G will be interpreted as the profile-name, ignore-query is a reserved metadata declaration, and a=30 m is interpreted as attribute-value metadata.

3.4 Metadata Profiles

Metadata profiles allow the association of arbitrary metadata components with an identifier, which may then be used as metadata itself. Metadata sourced from a profile is considered one degree less specific than the mechanism that invoked the profile, but more specific than the next most general mechanism. For example, metadata sourced from an in-ARL profile will be overridden by any metadata directly communicated in-ARL, but will override that set by HTTP headers. A profile-name is a unique alphanumeric string, 64 characters or less.

profile-name=1*64alphanum

Metadata associated through a profile must be able to be sourced from the mechanism that invokes the profile; for example, a profile invoked by response header must not contain request metadata. Profile-names preferably are communicated as metadata components.

4. Coherence

The CDNSP serves objects for customers authoritatively; that is, it holds definitive instances of objects that have been migrated to the CDN. Because many of the benefits of a CDN (e.g., performance, load shedding, availability) are lost if the origin server is contacted upon every request, a mechanism to maintain the freshness, or coherence, on the CDN servers, is highly desirable. The following specifies several mechanisms with which customers may maintain object coherence. While these mechanisms are intended to be used CDN servers, some may affect downstream caches as well. Coherence mechanisms are invoked as metadata, and every object must have a coherence mechanism associated with it in some way. If an origin server response contains an error status code (i.e., 4xx or 5xx), specified coherence will not be applied to the response; however, the response may be cached for a short period of time.

4.1 Coherence Mechanisms

4.1.1 Nonce Coherence

A nonce is a part of the published-Request-URI that changes every time the object it refers to does. It maintains object freshness inherently, because the cache index changes whenever the published URL does (assuming that the customer changes all references, and the objects referencing the target object are fresh themselves). Nonces may be generated by taking a MD5, SHA or similar hash or CRC of an object, incrementing an integer each time it changes, using a last modified timestamp or other mechanism. Preferably, the responsibility for assuring that the nonce and references to the object instance change lie solely with the origin server. Like other metadata, nonces will be stripped from the request-URI before it is forwarded to the origin server, removing the need to rename or relocate the object every time it changes. Nonces must be communicated as in-ARL metadata. CDN servers will assign nonced objects an infinite lifetime, unless they also have an overlapping coherence mechanism (for example, a TTL). Preferably, the CDN servers reserve the right to evict all previous instances of nonced objects when a new nonce is received.

4.1.2 TTL Coherence

This mechanism allows specification of a maximum freshness lifetime, which is functions in a manner similar to a Cache-Control: max-age HTTP response header, but only on the CDNSP's servers. TTL coherence is transmitted as metadata, and may be invoked by any described mechanism. It is not passed on to downstream clients; customers wishing to control cacheability there should use HTTP Cache-Control or similar mechanisms.

Under most circumstances, the TTL value should not be less than 15 minutes. However, it may be useful to specify a shorter, or even zero, TTL, if frequent validation is required. However, this may affect performance, unless the target objects have a very high request rate, or are very large.

4.1.3 Null Coherence

Objects that cannot be kept coherent in any way on CDN servers can have null coherence assigned to prevent their storage. Preferably, CDN servers will treat such objects as uncacheable, and will forward every request for them to them to the origin server. Non-idempotent (e.g., POST) requests have null coherence implicitly assigned to the them; other types of coherence assigned to them preferably will be ignored.

CDN Server Interface Specification—CDN Configuration

1. Host Configuration Table

The Host Configuration Table contains CDNSP-wide metadata, including hints that enable locating customer-specific metadata. This section describes the format of the HCT, defines its contents, and the method used to find entries in it when matching requests.

1.1.1 HCT Content

Conceptually, host configuration table entries follow a dictionary form, keyed on the Customer Configuration ID.

HostHeaders list—a list of Host request header values inARLTokens list—a list of strings to match in-ARL ActiveCustomer flag—boolean to indicate whether matching requests should be allowed.

1.1.2 HCT Format

The HCT is preferably an XML file, with all entries contained by the 'cdnsp-config' element. 'cdnsp-config' may contain any number of 'hct' elements; each 'hct' represents a separate Host Configuration Table, and must have a different 'version' attribute, which is required. The 'hct' element may contain any number of 'config' elements, which have a required attribute, 'id', and an optional attribute, 'active'. 'id' indicates the relevant customer configuration file identifier, while 'active' indicates whether the customer is active; by default, they are (which implies 'yes'). If it is set to 'no', the customer is inactive, and requests that match this entry will be denied. The 'config' element may contain any number of 'hostHeader' and 'inARLToken' elements, which indicate the host headers and in-ARL tokens to match, respectively. They must each contain exactly one string to match. For example,

```
<cdnsp-config>
    <hct version ="3.3">
        <config id="example.data" active="yes">
            <hostHeader>example.com<hostHeader>
            <hostHeader>*.example.com<hostHeader>
            <inARLToken>example</inARLToken>
        </config>
    </hct>
</cdnsp-config>
```

1.1.3 HCT Matching

Both the HostHeader and inARLToken elements are used to match some part of the request to an entry in the Host Configuration Table. All are considered case insensitive for purposes of matching. Port numbers and trailing periods will also be stripped from Host headers before matching, to normalize hostnames. Both element values may also contain wildcards. The '*' wildcard will match one or more whole period ('.') delimited string segments, without the trailing period. The '?' wildcard will match exactly one period-delimited string, without the trailing period. HostHeader and inARLToken element values may contain at most one wildcard, and the wildcard must be the first character in the value. If more than one element matches a request, the most specific will be used; if there is an exact match, it will take precedence. Otherwise, the least number of period-delimited segments captured by the wildcard will be used. If both a '*' and '?' wildcard meet this condition, the element containing the '?' wildcard will take precedence. Each value in Host-Headers and inARLToken elements must be globally unique in the scope of that element. For example, if the string 'foo' appears in an inARLToken element, no other inARLToken element in the HCT may contain that value.

Metadata Specification

1. Overview

Metadata is used to communicate desired handling information for objects to CDN servers. The representation of metadata when it is communicated depends on how it is assigned. To accommodate different assignment mechanisms, one may define component names and values separately, so that each mechanism may specify how they are to be formatted.

component-name=token
component-value=TEXT

For convenience, rules ending in '-a' reference component names, whereas rules ending in '-v' reference component values. Information on how each mechanism formats metadata, including appropriate encoding for component-values, is described above. Two types of metadata components are defined; request and response. Request components are applied with objects before they are fetched from the origin server and therefore must not be associated by mechanisms that operate after contacting the origin server (such as HTTP headers, and some types of implicit metadata assignment). Response metadata components may be associated with objects by any available mechanism. Most component names have a shorter (one to three letter) alternative form. This is to allow freeform in-ARL metadata to be used without needlessly increasing the length of the resulting URL. Short forms of attribute names should not be used in other metadata assignment mechanisms.

2. Metadata Security 2.1.1 Security Sensitive Metadata

Some metadata components can be used to invoke authentication, access control and other security-related functions. Preferably, the CDN limits access to objects, so that only CDN servers may fetch them. This can be accomplished in a few different ways:

Identifying CDN servers to the origin server
using a client-side SSL certificate to authenticate the CDN content server
with HTTP authentication (append an Authorization request header)
with a cookie (append a Cookie request header)
Obfuscating the origin-Request-URI
by request-URI munging
by configuring the CDN server to rewrite the URI before fetching from the origin server It should be noted that solutions that identify CDN servers to the origin server require the customer to enforce access control (based on a cookie, HTTP authentication, or SSL certificate), and the rewriting solution relies on the secrecy of the authenticator (which may take the form of a 'secret' directory), and are only effective if the customer enforces them. Preferably, the CDNSP also tightly binds the application of the security mechanism to the access limitation, so that it is only invoked when both are used. For instance, if a protected object is available at:

. . . //a.500.g.akamaitech.net/www.foo.com/bar.gif and CDN servers are configured to send an identifying cookie, they should only be configured to do so for requests that are indeed protected. This can also be accomplished by associating the protection mechanism with the origin server's response, for example, by communicating it with a HTTP response header. Alternatively, the customer may provide the CDNSP with a list of IP addresses that must match an HCT entry in order to be contacted; if any request resolving to those addresses does not have an HCT entry, a 403 Forbidden error will be returned.

Finally, different metadata communications mechanisms have different security profiles; in particular, it is not useful to communicate security-sensitive metadata in-ARL, because a knowledgeable user can remove the metadata component and thereby circumvent protection. Security-sensitive metadata must not be able to be unset in-ARL.

2.1.2 Use of Cookies

The HTTP state management mechanism ("Cookies") compartmentalizes services based on the origin server's identity; by default, cookies cannot be sent to a hostname different to that which set them. This assures that a cookie is sent only to the originating site. Preferably, metadata components that add a Set-Cookie header to responses, pass them from origin servers to clients, process cookies from clients or pass them to origin servers, will only function when the Host header does not point to a CDNSP virtual hostname. Note that request formats that do not use the Host header to match an HCT entry may use a CNAME or delegated domain, and when this is true they may use cookies.

3. Request Metadata Components

The system includes request metadata components that may be assigned by request mechanisms, as they have the potential to modify the request in some way. Representative components include:

3.1. Bandwidth-Dependent Rewrite

This component directs CDN servers to rewrite origin-request-URIs based on their knowledge of the client's bandwidth. For example, there may be two possible bandwidth groupings "high" and "low." If this component is active, requests from clients identified as "high" bandwidth are rewritten accordingly, e.g., from 'foo/bar.gif' to 'foo/bar.hi.gif.' Request from clients identified as "low" bandwidth are preferably not rewritten. This component is Boolean.

3.2 Cookie Identification

Some customers may wish to know when content is being sent to CDN servers, so that they can modify the response, or deny non-CDNSP requests for resources. To accommodate this, the CP may specify a cookie to be appended to CDN server requests when communicating with their origin server. This component should not be specified in-ARL, and configuration files that contain send-cookie directives should be authenticated and SSL-protected.

4. Response Metadata Components

The system also includes response metadata components that may be assigned by response mechanisms. The following are representative.

4.1 Maxage

This component specifies a freshness lifetime for the object on CDN servers, that operates in the same fashion as a Cache-Control: max-age response header on a traditional proxy cache, except that delta-time is specified.

4.2 Check Referrer

This component helps customers ensure that their content is only referenced from authorized sites, by comparing the hostname portion of the Referer request header to a specified value.

check-referer-a="check-referer"
check-referer-v=1~token

The component value is a comma-separated list of tokens that will be suffix matched against the hostname portion of the Referer URL. For example, check-referer=.foo.com will only allow requests that have a referer that contains a hostname in the domain foo.com. In this case, www.foo.com, images.foo.com and foo.foo.com will be allowed, while foo.com and www.foo.com.au will not. If the referer does not match the given value, an 403 Forbidden status will be returned. If no Referer is available, or it is not a parseable URL, the request will be allowed. This component may not be set or unset in-ARL.

4.3 Centralized Cookie Authentication

Customers often authenticate access to objects by checking for the presence of a stateful cookie [RFC2109]; this component allows them to use such mechanisms with the CDN. Protected objects are kept in cache on the CDN content server, but each request preferably is validated on the origin server (with the submitted HTTP Cookie header) in order to assure correct authentication. For example, imagine that a customer wishes to use cookies to authenticate all access to an object whose ARL is:

. . . //a500.g.akamaitech.net/7/500/1/001/www.foo.com/bar.gif and the cookie specified for authentication is called "auth". When a CDN server receives a request for an object protected by Cookie Authentication, it will revalidate it (i.e., submit an If-Modified-Since request to the origin server), with the new Cookie HTTP header value for "auth". Requests that do not contain a correct "auth" cookie value (as determined by the origin server) can be responded to with an error message or redirection to a login page by the origin server, which the CDNSP will not cache.

4.4 Centralized HTTP Authentication

This component allows objects protected by HTTP Basic authentication [RFC2617] to be served from cache to clients who present correct credentials in the object's authentication realm. Credentials for each client are validated on the origin server as needed. Customers may specify a period of time for which each client's authentication credentials are cached on CDN servers. Once a client is authenticated on the origin server, their credentials are cached, and will be accepted for requests in the same authentication realm without validation on the origin server. Customers may specify a TTL of '0' to denote that credentials should be checked on the origin server upon every access. Customers must use a CNAME or delegated host to utilize this component

4.5 Distributed Authentication

Distributed authentication instructs CDN servers to restrict access by checking the encrypted contents of a cookie:

```
distributed-auth-a = "auth-dist" | "da"
distributed-auth-v = cookie-name
distributed-auth-salt-a = "auth-dist-salt"
distributed-auth-salt-v = 4digit
```

The salt is used in the cookie encryption process, and must be present if distributed authentication is used. While the cookie name itself is not sensitive to security issues, the salt is, and may not be set or unset in-ARL. The customer must use a CNAME or delegated host to utilize this component.

Figure 6:
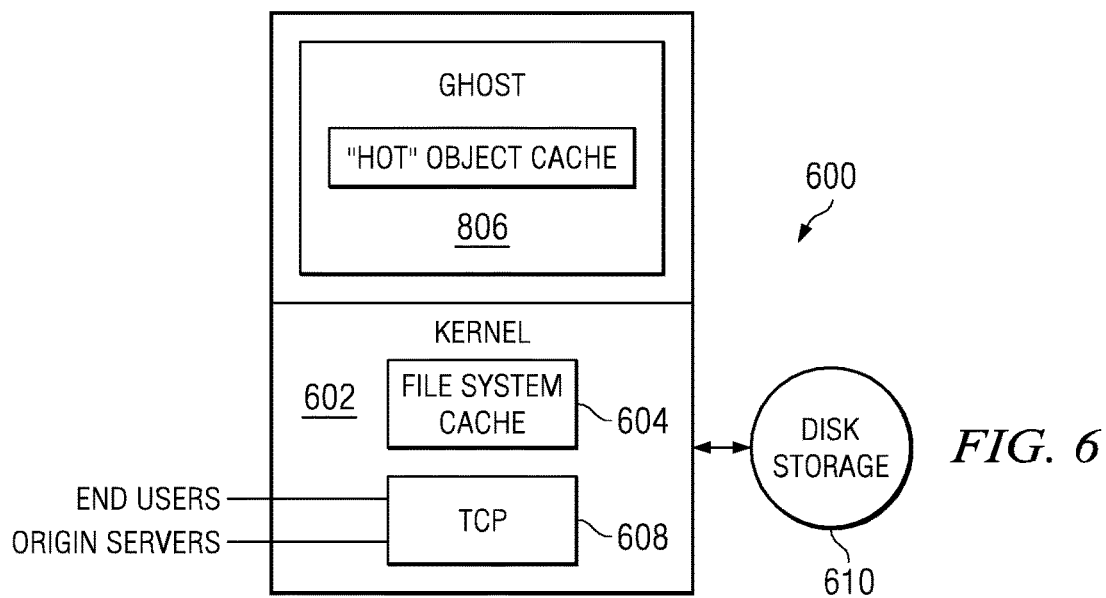
FIG. 6 is a block diagram of a CDN content server.
Figure 5:
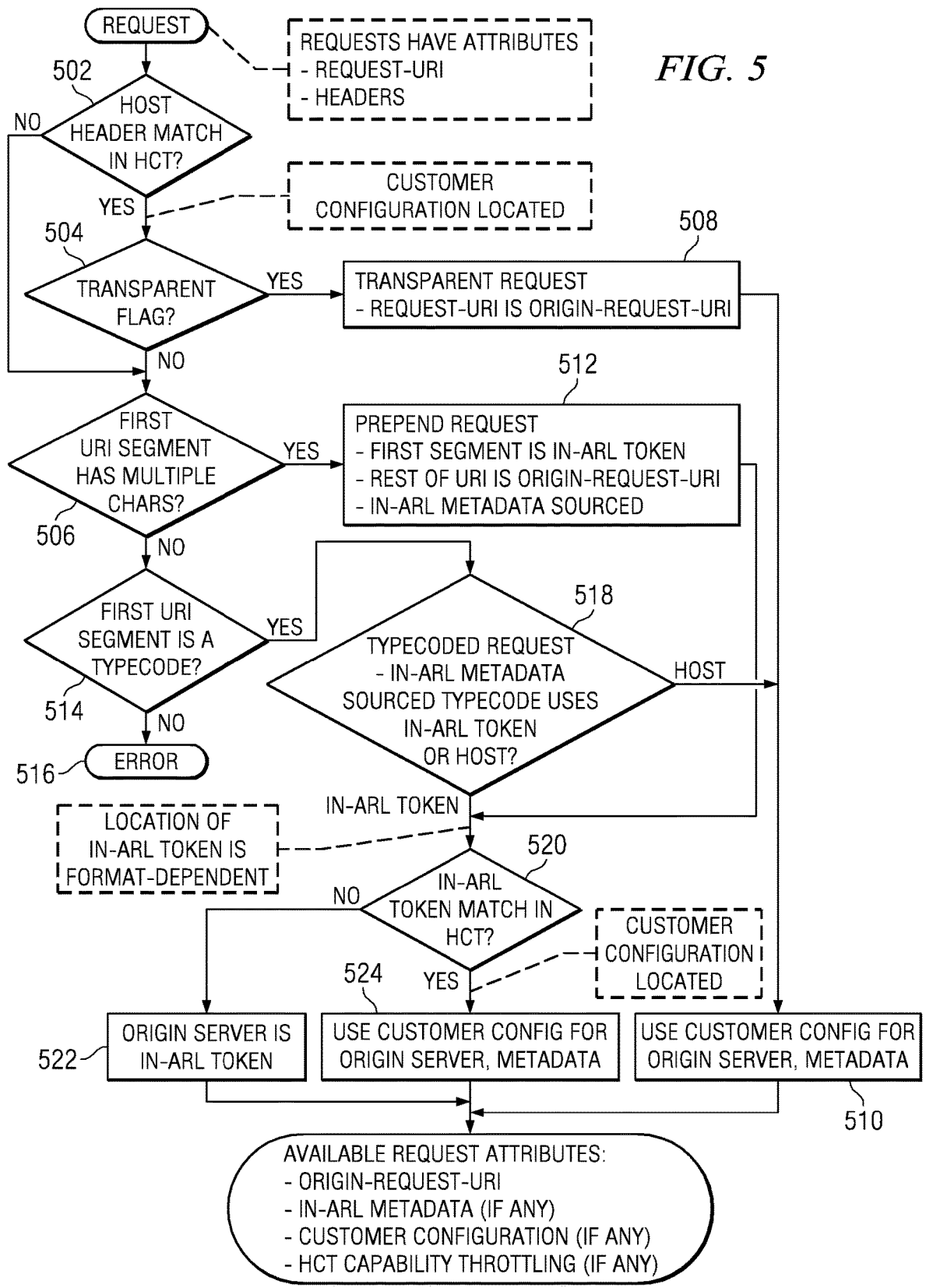
FIG. 5 is a flowchart illustrating a CDN server request identification and parsing routine of this disclosure.

FIG. 5 is a flowchart illustrating a server request identification and parsing routine according to this disclosure. This routine is preferably implemented as software, namely, a set of program instructions or code, that are executable in a processor running on a content server platform. It assumes that object metadata may be delivered in-band (in-ARL, HTTP response header) or out-of-band (via configuration file). FIG. 6 illustrates a typical machine configuration for a CDN content server. Typically, the content server 600 is a Pentium-based caching appliance running an operating system kernel 602 (e.g., based on Linux), a file system cache 604, CDN global host (or "ghost") software 606, TCP connection manager 608, and disk storage 610. CDN ghost software 606 is useful to create a "hot" object cache 612 for popular objects being served by the CDN. In operation, the content server 600 receives end user requests for content, determines whether the requested object is present in the hot object cache or the disk storage, serves the requested object via HTTP (if it is present) or establishes a connection to another content server or an origin server to attempt to retrieve the requested object upon a cache miss. The request identification and parsing routine may comprise a part of the ghost software 606 or it can be a standalone process or routine. The function of the routine is to respond to an object request and to generate a set of request attributes including the object metadata.

The routine begins in response to receipt of an object request. It is assumed that the CDN content server has an HCT with entries that point to a directory of customer configuration files, which are available from the CDN content server. A typical request has the following attributes: request-URI and headers. Consider the following URL: . . . //a516.g.akamai net/7/516/1/00730d6357e191/wwwfp.akamai.com/graphics/logo2_274.gif. A client browser requests this object by issuing a GET request as follows:

GET 7/516/1/00730d6357e191/wwwfp.akamai.com/graphics/logo2_274.gif

HH: a516.g.akamai.net

At step 502, a test is made to determine whether there the host header delivered with the GET request matches any entry in the HCT. If so, the match points to the customer configuration file and the routine branches to step 504. At this step, a test is made to determine whether the Transparent flag is set. If this flag is set, there is no metadata in the URL. If the Transparent flag is not set, the routine returns to step 506, which is also the path taken if the output of step 502 indicates that there is no Host Header match in the HCT. If the Transparent flag is set, the routine continues at step 508. At this step, the request-URI is set to the origin-request-URI as the request is transparent and there is no metadata in the URL. Taking the right-most path in the flowchart, the routine then continues at step 510 to retrieve customer configuration data in the customer configuration file to identify the origin server. The customer configuration file may also include "implicit" metadata which may be later applied to the object.

If there is no HCT match in the host header (or no host header), the routine operates as follows. In step 506, on the left-most path, a test is performed to determine whether the first URI segment has multiple characters. The first URI segment is the segment that follows the first "/" character. In the above example, the first segment includes a typecode as opposed to multiple characters. If the outcome of the test at step 506 indicates that the first URI segment includes multiple characters, the routine branches to step 512 because the request is a CDNSP prepend request. In such case, as indicated at block 512, the first segment is an in-ARL token, the rest of the URI is the origin-request-URI, and the metadata may be sourced in-ARL. If the outcome of the test at step 506 indicates that the first URI segment does not have multiple characters, a test is made at step 514 to determine whether the first URI segment is a typecode. If not, the routine routines an error at step 516. If the outcome of the test at step 514 is positive, the routine branches to block 518 because the request is a typecoded request (as in the above example); in such case, the metadata may be sourced in-ARL depending on the specific typecode In particular, the location of the in-ARL token is format-dependent.

At step 520, a test is performed on the in-ARL token (in block 512 or 518) to determine whether the token has a match in the HCT. If not, the routine branches to block 522, which indicates that the origin server identity is in-ARL. If the outcome of the test at step 520 is positive, the routine branches to step 524, wherein customer configuration data in the configuration file is used to identify the origin server and any applicable metadata.

Thus, once a request has been parsed and an origin server is associated with it, metadata (either in-ARL or implicitly associated) for modifying the request can be applied to it. The metadata is applied according to the precedence rules shown in FIG. 4. This includes path aliasing (which modifies the origin-request-URI), cookies to identify the CDN server, and other metadata. At this point, the object may be fetched from cache, if available, or fetched from the origin server, if not available. Before the object is served, all remaining metadata should be applied to the object in the following order: implicit metadata, as specified in a configuration file, HTTP response header metadata, and in-ARL metadata.

Figure 7:
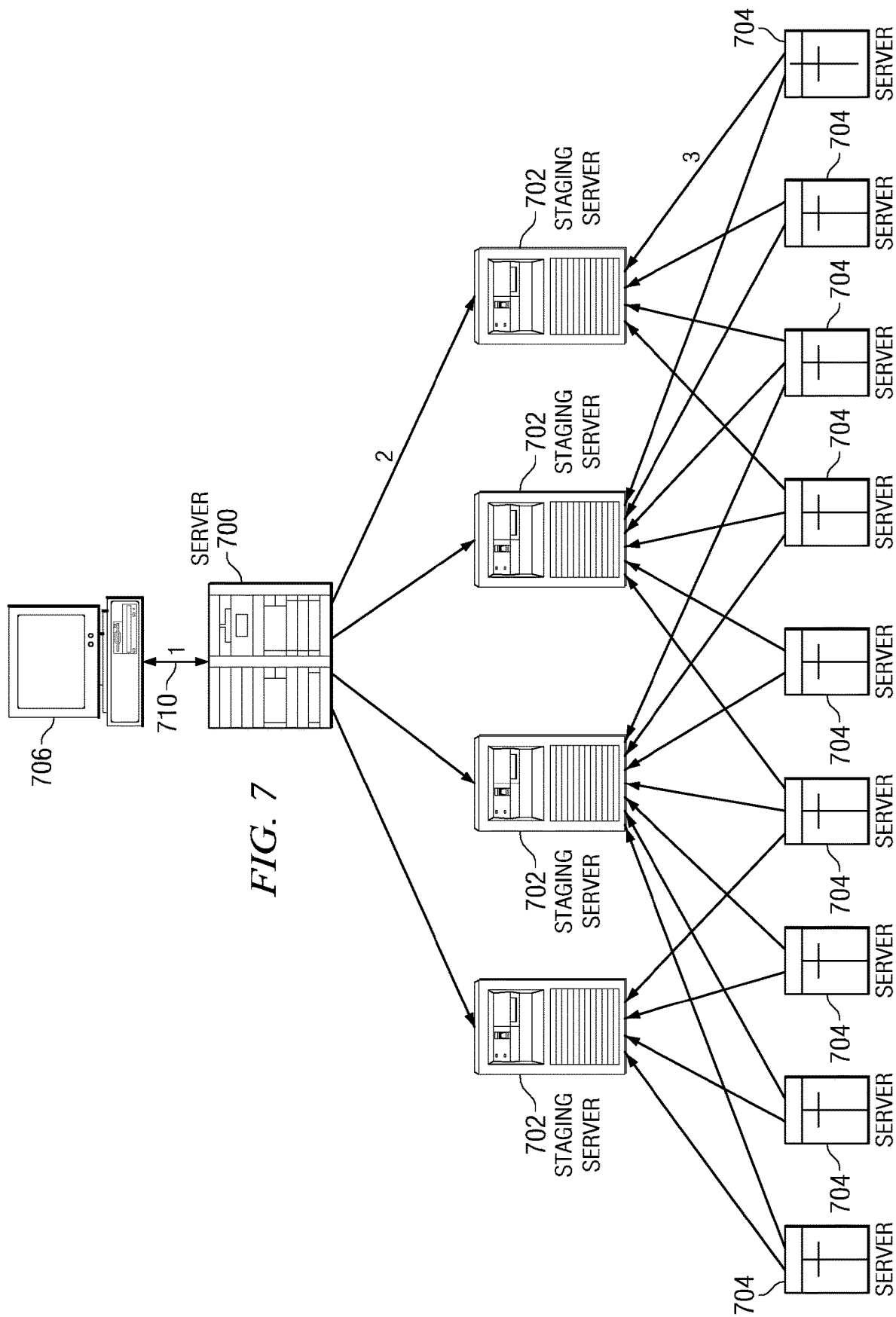
FIG. 7 is a simplified block diagram of a metadata transport mechanism that may be useful in disclosed technique.

As described above, metadata configuration files can be distributed to the CDN content servers using a centralized metadata transport mechanism. FIG. 7 illustrates a representative metadata transport mechanism at a high level. In the illustrative embodiment, the mechanism comprises three (3) main subsystems or components: a metadata server 700, a set of staging servers 702, and the CDN content servers 704. The server 700 preferably originates transfers of metadata configuration files on the CDN. In the illustrated example, the server 700 receives configuration files from the CDNSP, or from authorized CDN customers who enter them, for example, via a user interface (to be described below) available on a customer-facing portal site 706. The portal site 706 typically is an extranet application that may be accessed using a web browser over the Internet or other computer network. Communications between the portal site and the purge server preferably occur over a secure and authenticated (e.g., SSL) link 710. The staging servers 702 process accepted configuration files. In particular, the staging servers preferably store configuration files to be requested by the content servers 704. The content servers 704 are the CDN "edge" servers that actually deliver customer content to requesting end users.

In operation, CDN customers log into the customer portal and create configuration files. Alternatively, the CDNSP creates the configuration files from data supplied by the customer. In a preferred embodiment, the server 700 is responsible for hosting configuration files, validating them, issuing an identifier (ID) for each file, batching configuration files, and pushing them to the staging servers. Preferably, the server 700 also regularly polls the content servers 704 to determine when a given transfer of a batch of configuration files is complete.

The staging servers 702 preferably are geographically distributed across the CDN and receive configuration files from the server 700. The staging server's role is to hold the configuration files for communication to the content servers. A given CDN content server may communicate with a given staging server, or a set of such servers. Preferably, the staging servers establish and manage all connections between file requests and the CDN. All communication between the staging servers and the content servers preferably occurs via secure and encrypted communication. Preferably, a staging server uses an HTTP server (e.g., Apache) to deliver the files, and those requests may be compressed prior to transmission. The content servers 304 periodically contact the staging servers to check for new or waiting configuration files. Once content servers receive a configuration file, they begin using the metadata therein to handle object requests.

In a preferred embodiment, a given content server may use the content delivery network itself to obtain the configuration file. This reduces the load on the staging server components of the system. In addition, if content servers (e.g., a set of servers within a CDN region) are sharing content, a given content server may share the configuration file with other content servers. Although the use of staging servers and the pull-based system illustrated in FIG. 7 is advantageous, a given metadata configuration file may just be pushed out to the CDN servers when it changes.

Having thus described our invention, what we claim is set forth below.

The invention claimed is:

1. A computer program product in a non-transitory computer readable storage medium holding computer program instructions executable in a hardware processor, the computer program instructions comprising:

program code executed by the hardware processor to receive and store a data structure that identifies content provider domains, wherein at least one entry in data structure comprises a content provider domain that is aliased to an alternative domain, the at least one entry pointing to a configuration associated with the content provider domain;

program code executed by the hardware processor to receive a request for a resource, the request being received as a result of a domain name service (DNS) query to a content provider domain being resolved using the alternative domain in lieu of the content provider domain, the request for the resource having a host header associated therewith, the host header including a name value;

program code executed by the hardware processor to determine whether the name value in the host header matches any content provider domain entry in the data structure;

program code executed by the hardware processor to apply a capability throttling to a service when the name value in the host header matches any content provider domain entry in the data structure; and program code executed by the hardware processor to serve the resource in response to the request after the capability throttling is applied.

2. The computer program product as described in claim 1 wherein the resource is one of: a markup language page, an embedded object of a markup language page, a media file, and a software download.

3. The computer program product as described in claim 1 wherein the capability throttling restricts the service from being applied.

4. The computer program product as described in claim 1 wherein the program code is executed by the hardware processor in a content delivery network edge server machine.

5. The computer program product as described in claim 1 wherein the content provider domain is aliased to the alternative domain using a canonical name (CNAME).

6. The computer program product as described in claim 1 wherein capability throttling is not applied when the name value does not match any content provider domain in the data structure.

7. The computer program product as described in claim 1 wherein the configuration is uniquely associated with the content provider domain.

8. The computer program product as described in claim 1 wherein the host header is a host header of an HTTP GET request.

9. The computer program product as described in claim 1 wherein the non-transitory computer readable storage medium is one of: a disk, and a computer memory.

\* \* \* \* \*